April 28, 1959　　K. O. R. SCHÖLDSTRÖM　　2,884,542
PHOTOELECTRIC DEVICE
Filed Nov. 25, 1955
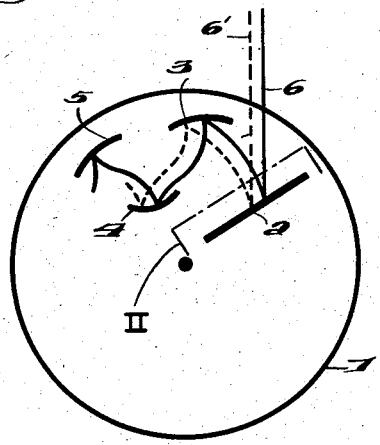
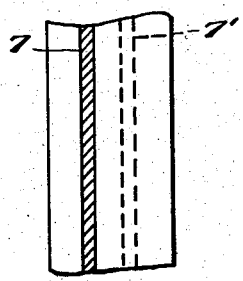
INVENTOR
KARL OTTO RAGNAR SCHOLDSTRÖM,
BY Lawson and Taylor
ATTORNEYS

United States Patent Office 2,884,542
Patented Apr. 28, 1959

2,884,542
PHOTOELECTRIC DEVICE

Karl Otto Ragnar Schöldström, Lidingo, Sweden, assignor to Svenska Aktiebolaget Gasaccumulator, Lidingo, Sweden, a corporation of Sweden Application November 25, 1955, Serial No. 549,137

Claims priority, application Sweden November 24, 1954

3 Claims. (Cl. 250—216)

The present invention refers to a photoelectric device comprising a photo tube and an optical system for concentrating an incoming beam of light on the tube cathode. The invention is particularly applicable for optical range finding purposes but is also applicable in such cases where it is desired to remove the disadvantages due to transit time effects within the photoelectric tube.

Certain types of range finding devices utilize modulated light, which is picked up by a photocell and is transformed into electrical signals. The phase of the latter can then be compared for the purpose of measuring the distance with the phase of a reference signal. It is obvious that if the transit time within the photocell is of such magnitude as to be equivalent to a measurable phase displacement, it is important that the transit time have a fixed, constant value.

For a given type of tube the transit time is dependent upon the path of the electron and the tube voltage. Under ordinary circumstances, modern technology makes it possible to hold the voltage constant within the required limits. However, the length of the path depends upon from which point of the photo cathode the emission starts. If a comparatively large area of the cathode is hit by the incoming light, the transit time will as a rule be different for different points and an effective transit time is arrived at, which is some kind of average for these points. This average will also depend on the distribution of light over the pick-up area.

According to the present invention, the disadvantages of earlier devices are removed through a construction of the optical system such that the incoming beam of light strikes the tube cathode on a surface area of such form that the transit time through the tube for electrons emitted from the area has essentially the same value.

The word "area" is used in the present description and claims to designate a two-dimensional set of points of arbitrary type but excluding the case that the set comprises a single point. For instance, it may be formed by a plurality of isolated points or by a line or surface sections or by combinations of these types of sets. Thus, the only type of set that is not comprised under the designation "area" is the one consisting of a single isolated point. A concentration of the incoming light on such an area is not desirable owing to the heavy loading on the cathode caused thereby.

According to a particular embodiment of the invention, the area may have the form of one or more lines or narrow strips. For many photoelectric tube constructions it is conceivable that systems of points on the photo cathode can be found, which may possibly merge into lines, and for which the transit time has essentially the same value.

According to a further embodiment of the invention, which makes it possible to realize the basic concept of the invention in a particularly simple manner, the photoelectric tube comprises a photomultiplier (electron multiplier) with cylindrical electrodes. The optical system, according to the invention, is then constructed so as to concentrate the incoming light on one or more axial lines or strips on the photo cathode.

The lastmentioned embodiment is illustrated on the attached drawing, on which:

Figure 1 shows a cross section of a photoelectric tube with electrodes of cylindrical shape, and Figure 2 shows a partial section of the tube taken upon the line designated II in Fig. 1.

The plane of Fig. 1 is thought of as being normal to the axis direction, 1 designating the tube wall, within which there is placed a photo cathode 2 and behind the same in the direction of electrode movement, subsequent electrodes 3, 4, 5 and so on. Only the first few electrodes have been drawn. A beam of light, which is actually of the shape of a plane disc, is designated by the full-drawn line 6 and the position of an imagined adjacent beam is indicated by means of the dash-line 6'. A beam 6' would, in accordance with the above, result in a transit time different from that corresponding to the beam 6.

Fig. 2 shows a partial view taken upon the line II of Fig. 1 and illustrates the manner in which the beam 6 hits the cathode 2 along a strip or band 7, whereas the imagined beam 6' would correspond to a strip 7'. According to the invention, the optical system combined with the tube is of such construction as to make the incoming light beam hit the cathode 2 along an axial line or strip 6. Owing to the cylindrical construction of the arrangement, all forces acting upon the electrons are normal to the axis direction, so that all the electron paths corresponding to different issue points of the strip 7 have the same length and correspond to the same transit time. The axial extension of the arrangement obviously must be determined with a view to the permissible cathode loading.

The optical part can obviously be of any arbitrary known type and has not been illustrated on the drawing.

What is claimed is:

1. A photoelectric device, particularly for optical distance measuring purposes, comprising, in combination, a photoelectric tube having different values of transit time for electrons released from different surface elements of the cathode thereof and an optical system for concentrating an incoming beam of light on a plurality of points on the tube cathode, said optical system being adapted to direct the incoming light to portions of the tube cathode surface such as to make the transit time through the tube for the electrons released from said portions essentially the same.

2. A device as claimed in claim 1, characterized in that the portions are composed of narrow strips.

3. A device as claimed in claim 1, in which the photoelectric tube is a photo multiplier with cylindrical electrodes, and the optical system is adapted to concentrate the incoming light to at least one axial line on the photo cathode.

References Cited in the file of this patent

UNITED STATES PATENTS 2,292,847    Rajchman _____ Aug. 11, 1942
2,796,547    Nevin _____ June 18, 1957

OTHER REFERENCES

Zworykin: "Photoelectricity and its Applications," John Wiley & Sons, Inc., New York, 1949, pp. 113 and 454.